(12) United States Patent
Garcia Andarcia et al.

(10) Patent No.: US 8,523,979 B2
(45) Date of Patent: Sep. 3, 2013

(54) REMOVAL OF ACID GASES BY MEANS OF AN ABSORBENT COMPRISING A STRIPPING AID

(75) Inventors: Hugo Rafael Garcia Andarcia, Mannheim (DE); Ralf Notz, Ludwigshafan (DE); Georg Sieder, Bad Dürkheim (DE); Oliver Spuhl, Mannheim (DE); Hans Hasse, Kaiserslautern (DE); Inga Toennies, Kaiserslautern (DE); Sebastian Hoch, Kaiserslautern (DE); Hari Prasad Mangalapally, Kaiserslautern (DE)

(73) Assignee: BASF SE, Ludwigshafen (DE)

( * ) Notice: Subject to any disclaimer, the term of this patent is extended or adjusted under 35 U.S.C. 154(b) by 352 days.

(21) Appl. No.: 12/819,872

(22) Filed: Jun. 21, 2010

(65) Prior Publication Data
US 2010/0319540 A1    Dec. 23, 2010

(30) Foreign Application Priority Data

Jun. 22, 2009 (EP) .................................. 09163401

(51) Int. Cl.
*B01D 53/14* (2006.01)
(52) U.S. Cl.
USPC ................. 95/183; 95/193; 95/209; 95/236; 423/228
(58) Field of Classification Search
USPC ................. 95/180, 183, 193, 199, 209, 228, 95/236; 96/193–194, 183, 234, 242, 266
See application file for complete search history.

(56) References Cited

U.S. PATENT DOCUMENTS

| | | | | |
|---|---|---|---|---|
| 4,705,673 A | * | 11/1987 | Capobianco et al. | 423/226 |
| 6,117,404 A | * | 9/2000 | Mimura et al. | 423/228 |

(Continued)

FOREIGN PATENT DOCUMENTS

| | | |
|---|---|---|
| CA | 1295810 C | 2/1992 |
| EP | 0 202 600 A2 | 11/1986 |

(Continued)

OTHER PUBLICATIONS

Kohl et al., Gas Purification, 5th Edition, Gulf Publishing Company (1997), pp. 40-50.

(Continued)

*Primary Examiner* — Duane Smith
*Assistant Examiner* — Pankti Patel
(74) *Attorney, Agent, or Firm* — Novak Druce Connolly Bove + Quigg LLP

(57) ABSTRACT

A process for removing acid gases from a fluid stream in which a) the fluid stream is treated with an absorption liquid which comprises at least one amine, a stripping aid, and water, wherein the stripping aid is selected from water-miscible liquids, the boiling temperature of which at atmospheric pressure is lower than that of water, b) the treated fluid stream is treated with a liquid aqueous phase in order to convert entrained stripping aid at least in part to the aqueous phase, c) the loaded aqueous phase is heated in order to expel the stripping aid at least in part, and d) the regenerated aqueous phase is cooled and at least in part recycled to step b). The stripping aid promotes the regeneration of the absorbent by stripping. Emissions of the stripping aid via the treated fluid stream are avoided by the treated fluid stream being scrubbed with a liquid aqueous phase.

20 Claims, 1 Drawing Sheet

(56) References Cited

U.S. PATENT DOCUMENTS

| | | | |
|---|---|---|---|
| 6,784,320 B2 * | 8/2004 | Mimura et al. | 564/497 |
| 7,481,988 B2 * | 1/2009 | Katz et al. | 423/220 |
| 7,906,087 B2 * | 3/2011 | Aroonwilas et al. | 423/210 |
| 7,981,196 B2 * | 7/2011 | Kang et al. | 95/183 |
| 8,206,489 B2 | 6/2012 | Cadours et al. | |
| 2001/0021362 A1 * | 9/2001 | Ishida | 423/228 |
| 2002/0059865 A1 * | 5/2002 | Lemaire et al. | 95/174 |
| 2004/0253159 A1 * | 12/2004 | Hakka et al. | 423/228 |
| 2008/0098892 A1 | 5/2008 | Asprion et al. | |
| 2009/0282977 A1 * | 11/2009 | Koss | 95/199 |

FOREIGN PATENT DOCUMENTS

| | | |
|---|---|---|
| EP | 1979073 | 10/2008 |
| FR | 2895273 A1 | 6/2007 |
| GB | 1069689 A | 5/1967 |
| WO | WO-2005087350 A1 | 9/2005 |
| WO | WO-2008/107050 | 9/2008 |
| WO | WO-2009/156271 | 12/2009 |
| WO | WO-2009/156273 | 12/2009 |
| WO | WO-2010/136425 | 12/2010 |

OTHER PUBLICATIONS

Satish Reddy et al., Fluor's Econamine FG Plus Technology, presented at the Second National Conference on Carbon Sequestration, National Energy Technology Department of Energy, Alexandria VA, USE, May 5-8, 2003.

Usubharatana et al., Energy Procedia, vol. 1, Issue 1, Feb. 2009, pp. 95-102.

Translation of International Search Report for PCT/E2010/05867.

Translation of International Preliminary Report on Patentability for PCT/EP2010/058687.

* cited by examiner

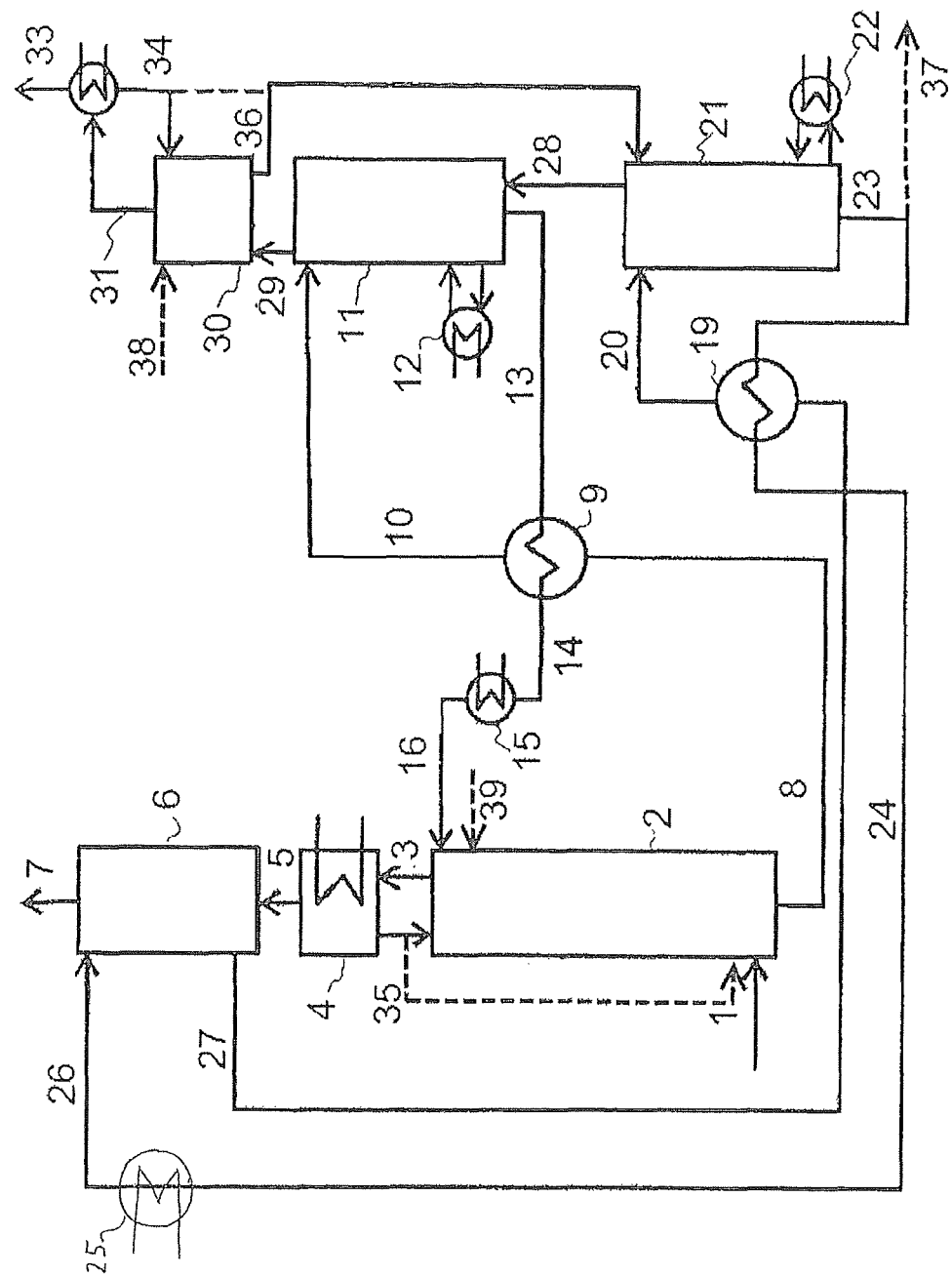

REMOVAL OF ACID GASES BY MEANS OF AN ABSORBENT COMPRISING A STRIPPING AID

CROSS REFERENCE TO RELATED APPLICATIONS

This application claims benefit of European application number 09163401.4, filed Jun. 22, 2009, the entire content of which is hereby incorporated by reference.

The present invention relates to a process for removing acid gases from a fluid stream, in particular for removing carbon dioxide from flue gases.

The removal of carbon dioxide from flue gases is desirable for various reasons, but in particular for reducing the emission of carbon dioxide, which is considered to be the main cause of what is termed the greenhouse effect.

On an industrial scale, for removing acid gases such as carbon dioxide from fluid streams, frequently use is made of aqueous solutions of organic bases, e.g. alkanolamines, as absorbents. On the dissolution of acid gases, in this case, ionic products form from the base and the acid gas components. The absorbent can be regenerated by heating, expansion to a lower pressure or stripping, in which case the ionic products react back to acid gases and/or the acid gases are stripped off by means of steam. After the regeneration process the absorbent can be reused.

Flue gases have very low carbon dioxide partial pressures (5-20 kPa) since they generally occur at a pressure close to atmospheric pressure and typically comprise 3 to 20% by volume of carbon dioxide.

Owing to the relatively low partial pressure of $CO_2$, for flue gas scrubbing amines are required which exhibit a high affinity to $CO_2$. Since tertiary amines can only bind $CO_2$ as bicarbonate in a reaction proceeding relatively slowly, tertiary amines are less preferred as absorbents for eliminating $CO_2$ from flue gases. Secondary, and especially primary amines, such as monoethanolamine, can also bind $CO_2$ in the form of carbamate; this reaction proceeds significantly more rapidly than conversion of $CO_2$ into bicarbonate.

The use of monoethanolamine in gas scrubbing is described, e.g. in Kohl, A.; Nielsen, R., Gas Purification, 5th edition Gulf Publishing Company (1997) pp. 40 ff. The use of monoethanolamine (MEA) for eliminating carbon dioxide from flue gases is described in Satish Reddy et al. Fluor's Econamine PG Plus$^{SM}$ Technology, presented at the Second National Conference on Carbon Sequestration, National Energy Technology Department of Energy, Alexandria Va., USA, May 5-8, 2003.

However, the high reactivity of primary amines is disadvantageously accompanied by a high absorption enthalpy and therefore a high energy requirement for regeneration. In addition, in the carbamate route, two molecules of amine are required in order to bind one molecule of carbon dioxide.

It has already been proposed to add organic compounds to the aqueous absorbent. For instance, EP-A 197 90 73 discloses that an alkanolamine absorbent for eliminating carbon dioxide from gas streams can comprise an organic compound such as, e.g. $C_{1-3}$ alkanols. The absorbent is worked up by evaporating it in two or more stages under decreasing pressures.

WO 2008/107050 describes a process for eliminating $CO_2$ from exhaust gases, wherein, in an exhaust gas scrubbing plant, the $CO_2$ is extracted from the exhaust gases by scrubbing by one or more $CO_2$-binding solvents. In the regeneration of the $CO_2$-loaded solvent, use is made of a stripping component. The stripping component is preferably an alkane, in particular a fluoroalkane.

Usubharatana, P. and Tontiwachwuthikul, P. under the title "Enhancement factor and kinetics of $CO_2$ capture by MEA-methanol hybrid solvents" in Energy Procedia, Volume 1, Issue 1, February 2009, pp. 95-102, reported on the elevated absorption rate of $CO_2$ into a hybrid solvent of MEA and methanol compared with an aqueous MEA solution.

Since organic compounds have a lower evaporation enthalpy than water, the addition of the organic compound can significantly promote the regeneration of the absorbent by stripping—if the organic component has a lower boiling temperature than water. The high vapor pressure of the organic component, however, leads to the fact that during scrubbing of the flue gas with the absorbent, the organic component passes over in a significant amount into the treated flue gas.

The object underlying the present invention is to specify a process for removing acid gases from fluid streams, in particular for removing carbon dioxide from flue gases, which combines efficient removal of the acid gases with simple regeneration of the absorbent and avoids contamination of the treated fluid stream with components of the absorption liquid.

The invention provides a process for removing acid gases from a fluid stream in which
a) the fluid stream is treated with an absorption liquid which comprises at least one amine, a stripping aid, and water, wherein the stripping aid is selected from water-miscible liquids, the boiling temperature of which at atmospheric pressure is lower than that of water,
b) the treated fluid stream is treated with a liquid aqueous phase in order to convert entrained stripping aid at least in part to the aqueous phase,
c) the loaded aqueous phase is heated in order to expel the stripping aid at least in part, and
d) the regenerated aqueous phase is cooled and at least in part recycled to step b).

In the process according to the invention use is made of an absorption liquid which comprises, as stripping aid, a water-miscible liquid, the boiling temperature at atmospheric pressure of which, is lower than that of water. Emissions of the stripping aid via the treated fluid stream are avoided by scrubbing the treated fluid stream with a liquid aqueous phase, wherein entrained stripping aid is at least in part converted into the aqueous phase.

It has surprisingly been found that the conjoint use of the stripping aid, in addition to the effect of the facilitated stripping, has further beneficial properties. For instance, the cyclic capacity of the absorbent is increased compared with an aqueous absorbent, as a result of which the circulation rate of the absorbent can be reduced. This reduces the required size of pipes, pumps and columns. Since the absorption rate of such hybrid absorption liquids is higher than that of aqueous systems, the height of the absorption column can be significantly reduced compared with an aqueous absorption liquid.

Before the treatment with the absorption liquid, the fluid stream, e.g. flue gas, is preferably subjected to a scrubbing with an aqueous liquid, in particular with water, in order to cool and moisten (quench) the fluid stream. During the scrubbing, dusts or gaseous impurities such as sulfur dioxide can also be removed.

The fluid stream is treated with the absorption liquid in a suitable device, in particular in an absorption tower or an absorption column, e.g. a dumped-bed random packed column, arranged packing column, a tray column and/or in another absorber such as membrane contactors, radial flow scrubbers, jet scrubbers, Venturi scrubbers and rotary spray scrubbers. The fluid stream is preferably treated with the absorption liquid in an absorption column in countercurrent flow. The fluid stream in this case is generally fed into the lower region of the column and the absorption liquid into the upper region of the column.

The temperature of the absorption liquid in the absorption step is generally about 30 to 70° C., when a column is used, for example, 30 to 60° C. at the top of the column and 40 to 70° C. at the bottom of the column. A fluid stream which is low in acid gas components, i.e. is depleted in these components, is formed and an absorption liquid loaded with acid gas components is formed.

The treated fluid stream is then treated with a liquid aqueous phase in order to transfer entrained stripping aid at least in part to the aqueous phase. In other words, the stripping aid which passed over into the fluid stream is scrubbed out again from it. A suitable liquid aqueous phase is, in particular, water itself. It is understood that when the process is carried out other components such as amine and stripping aid can pass into the aqueous phase, and thus the aqueous phase generally comprises components which are more or less different from water. The treated fluid stream is scrubbed with the liquid aqueous phase in a suitable device, in particular a scrubbing column, e.g. a dumped-bed random packed column, arranged packing column and tray column. The fluid stream in this case is generally fed into the lower region of the scrubbing column and the liquid aqueous phase into the upper region of the scrubbing column. The treated fluid stream can also be scrubbed in a section of the absorption column, configured as backwash section or enrichment part, above the feed-in of the absorption liquid. The scrubbing column is generally shorter than the absorption column.

In one embodiment of the process, the treated fluid stream is intercooled before the treatment with the aqueous phase. Suitable apparatuses for this are, for example, apparatuses such as tube bundle heat exchangers, plate heat exchangers and countercurrent flow film heat exchangers. Suitable tube bundle apparatuses are, in particular, apparatuses having finned tubes (longitudinal or transverse fins) and tubes having special internals such as twisted tape or HiTran elements. By means of the intercooling, the majority of the water and/or amine which is entrained by the treated fluid stream and also a part of the stripping aid can be condensed out. By this means excessive contamination of the aqueous phase with these components is avoided. The condensate can be recycled, for example, to the top of the absorption column. Preferably, the condensate is applied to the absorber bottom. The intercooling also facilitates the removal of the entrained stripping aid during the subsequent treatment of the fluid stream with the liquid aqueous phase.

Alternatively, the gas stream exiting at the top of the scrubbing column can also be cooled by a gas cooler and stripping aid can be retained thereby.

The aqueous phase loaded with the stripping aid is then heated in order to at least in part expel the stripping aid and to regenerate the aqueous phase. Preferably, the loaded aqueous phase is heated and passed into a regeneration column. The regeneration column can be a dumped-bed random packed column, arranged packing column or a tray column. By means of stripping, a gas stream comprising stripping aid can be generated. The stripping gas required for stripping is expediently obtained by boiling the bottom product of the regeneration column to which heat is fed directly or indirectly therefor, for example via a steam-heated reboiler.

In order to utilize the energy comprised in the hot regenerated aqueous phase, it is preferred to preheat the loaded aqueous phase from the scrubbing column by indirect heat exchange with the hot regenerated aqueous phase. By means of the heat exchange the loaded aqueous phase is brought to a higher temperature and so a lower energy input is required in the regeneration step.

The thus regenerated aqueous phase is cooled, preferably by indirect heat exchange in a suitable cooler, and recycled at least in part to step b).

From the absorption liquid which is loaded with the acid gas components, carbon dioxide and other acid gases can be liberated in a regeneration step, wherein a regenerated absorption liquid is obtained. In the regeneration step the loading of the absorption liquid is decreased and the resultant regenerated absorption liquid is preferably subsequently recycled to the absorption step.

Generally, the loaded absorption liquid is regenerated by heating, e.g. to 70 to 130° C., expansion, stripping with an inert fluid or a combination of two or all of these measures. Preferably, the loaded absorption liquid is regenerated in a stripper. The stripping gas required for the stripping is generated by partial evaporation of the absorption liquid in the bottom of the stripper. The presence of the stripping aid leads to an improved stripping effect and facilitates the liberation of the acid gases.

The conjoint use of the stripping aid further has the effect that the boiling temperature of the absorption medium decreases or the vapor pressure increases. At a given maximum temperature of, e.g. 130° C., therefore the pressure in the regeneration step can be increased and the $CO_2$ which is eliminated at the top of the stripper occurs at a higher pressure.

In order to withdraw permanently from the earth's atmosphere the carbon dioxide which is eliminated, the carbon dioxide is customarily compressed and then forced into subterranean deposits. If the carbon dioxide is produced during the regeneration of the absorption liquid at a pressure higher than ambient pressure, one or more low-pressure compression stages can be omitted and the expenditure on compression is reduced. If the regeneration of the absorption liquid is carried out at, for example, a pressure of 3 bar (absolute), one compression stage can be saved, at a pressure of 9 bar (absolute), two compression stages can be saved, compared with the liberation of the carbon dioxide at ambient pressure.

In an embodiment of the process, therefore the regeneration of the loaded absorption liquid proceeds in the stripper and the liberation of the acid gases at a pressure of at least 3 bar (absolute). The liberated acid gases are preferably fed without significant expansion into at least one compression unit. The compressed gases can then be fed to a permanent storage.

Before the regenerated absorption liquid is reintroduced into the absorber, it is cooled to a suitable absorption temperature. In order to utilize the energy present in the hot regenerated absorption liquid, it is preferred to preheat the loaded absorption liquid from the absorber by heat exchange with the hot regenerated absorption liquid. By means of the heat exchange the loaded absorption liquid is brought to a higher temperature, and so in the regeneration step a lower energy input is required. By means of the heat exchange, also a partial regeneration of the loaded absorption liquid can proceed with liberation of carbon dioxide.

The stripping aid or gas stream comprising the stripping aid which is expelled in the regeneration of the aqueous phase is preferably passed into the bottom of the stripper in which the loaded absorption liquid is regenerated. In this manner, the stripping of the loaded absorption liquid is intensified and the energetic and material integration of the scrubbing process and the absorption-desorption process is achieved.

The liberated acid gases exiting from the stripper are preferably cooled in order to condense out at least in part the entrained amine, water and/or stripping aid. Expediently, the liberated acid gases exiting from the stripper are scrubbed with a liquid phase in order to retain substantially the entrained amine and/or stripping aid from the liberated acid gases. As liquid phase, suitable liquids are water, the condensate arising on cooling of the liberated acid gases or preferably a mixture of the condensate and water. The liberated acid gases are scrubbed with the liquid phase in a suitable device, in particular a scrubbing column, e.g. a dumped-bed random packed column, arranged packing column and tray column. The liberated acid gases can also be scrubbed in a section of the stripper, configured as backwash section or enrichment part, above the feed-in of the loaded absorption liquid.

The liquid phase is removed at the bottom of this scrubbing section and applied at least in part to the regeneration column as reflux with bypass of the stripper. In addition, there is the option to take off water at the bottom of the regeneration column in order to close the material balance.

The stripping aid used according to the invention is selected from water-miscible liquids, the boiling temperature of which at atmospheric pressure is lower than that of water. These include in particular alcohols, such as methanol, ethanol, n-propanol, isopropanol; ethers, such as tetrahydrofuran; ketones such as acetone.

In suitable embodiments, the absorption liquid comprises 10 to 50% by weight, preferably 20 to 40% by weight, of stripping aid.

The absorption liquid comprises at least one amine. Preferably, the amine comprises at least one primary or secondary amine.

Preferred amines are the following:
(i) Amines of the formula I:

$$R^1R^2NH \quad (I)$$

where $R^1$ is selected from $C_2$-$C_6$-hydroxyalkyl groups, $C_1$-$C_6$-alkoxy-$C_2$-$C_6$-alkyl groups and 1-piperazinyl-$C_2$-$C_6$-alkyl groups and $R^2$ is selected from H, $C_1$-$C_6$-alkyl groups and $C_2$-$C_6$-hydroxyalkyl groups;
(ii) Amines of the formula II:

$$R^3R^4N—X—NR^5R^6 \quad (II)$$

where $R^3$, $R^4$, $R^5$ and $R^6$ independently of one another are selected from H, $C_1$-$C_6$-alkyl groups, $C_2$-$C_6$-hydroxyalkyl groups, $C_1$-$C_6$-alkoxy-$C_2$-$C_6$-alkyl groups and $C_2$-$C_6$-aminoalkyl groups and X is a $C_2$-$C_6$-alkylene group, —$X^1$—$NR^7$—$X^2$ or —$X^1$—O—$X^2$, where $X^1$ and $X^2$ independently of one another are $C_2$-$C_6$-alkylene groups and $R^7$ is H, a $C_1$-$C_6$-alkyl group, $C_2$-$C_6$-hydroxyalkyl group or $C_2$-$C_6$-aminoalkyl group, wherein at least one of the radicals $R^3$, $R^4$, $R^5$, $R^6$ and $R^7$ are H or a $C_2$-$C_6$-aminoalkyl group;
(iii) 5 to 7-membered saturated heterocycles having at least one NH group in the ring which can comprise, in the ring, one or two further heteroatoms selected from nitrogen and oxygen, and
(iv) mixtures thereof.

Specific examples are:
(i) 2-aminoethanol (monoethanolamine), 2-(methylamino) ethanol, 2-(ethylamino)ethanol, 2-(n-butylamino)ethanol, 2-amino-2-methylpropanol, N-(2-aminoethyl)piperazine,
(ii) 3-methylaminopropylamine, ethylenediamine, diethylenetriamine, triethylenetetramine, 2,2-dimethyl-1,3-diaminopropane, hexamethylenediamine, 1,4-diaminobutane, 3,3-iminobispropylamine, tris(2-aminoethyl)amine, bis(3-dimethylaminopropyl)amine,
(iii) piperazine, 2-methylpiperazine, N-methylpiperazine, 1-hydroxyethylpiperazine, 4-hydroxyethylpiperidine, homopiperazine, piperidine, 2-hydroxyethylpiperidine and morpholine; and
(iv) mixtures thereof.

Of these, monoethanolamine, piperazine, methylaminopropylamine, diethanolamine, 1-hydroxyethylpiperazine are particularly preferred.

Generally the absorption liquid comprises 10 to 60% by weight of amine.

The absorption liquid can also comprise additives such as corrosion inhibitors, enzymes, etc. Generally, the amount of such additives is in the range of about 0.01-3% by weight of the absorption liquid.

The method or absorbent according to the invention is suitable for the treatment of fluid streams, in particular gas streams of all types. The acid gases are, in particular, $CO_2$, $H_2S$, COS and mercaptans. In addition, $SO_3$, $SO_2$, $CS_2$ and HCN can also be removed. Generally, the acid gases comprise at least $CO_2$ or comprise exclusively $CO_2$.

Fluids, which comprise the acid gases are firstly gases such as natural gas, synthesis gas, coke oven gas, cracked gas, coal gasification gas, recirculated cycle gas, landfill gases and combustion gases, and, secondly liquids which are essentially immiscible with the absorbent such as liquefied petroleum gas (LPG) or natural gas liquids (NGL).

The method or absorbent according to the invention is particularly suitable for the treatment of oxygen-comprising fluid streams.

In preferred embodiments, the fluid stream originates
a) from the oxidation of organic substances,
b) from the composting or storage of waste materials comprising organic substances, or
c) from the bacterial decomposition of organic substances.

In some embodiments, the partial pressure of carbon dioxide in the fluid stream is less than 500 mbar, e.g. 30 to 150 mbar.

The oxidation can be carried out with appearance of flame, i.e. as conventional combustion, or as oxidation without appearance of flame, e.g. in the form of a catalytic oxidation or partial oxidation. Organic substances which are subjected to the combustion are customarily fossil fuels, such as coal, natural gas, petroleum, gasoline, diesel, raffinates or kerosene, biodiesel or waste materials having a content of organic substances. Feed stocks of the catalytic (partial) oxidation are e.g. methanol or methane which can be converted to formic acid or formaldehyde.

Waste materials which are subjected to oxidation, composting or storage are typically domestic refuse, plastic wastes or packaging refuse.

The organic substances are combusted mostly in customary combustion plants with air. The composting and storage of waste materials comprising organic substances generally proceed in refuse landfills. The exhaust gas or the exhaust air of such facilities can be treated advantageously by the method according to the invention.

As organic substances for bacterial decomposition use is customarily made of stable manure, straw, liquid manure, clarified sewage sludge, fermentation residues and the like. The bacterial decomposition proceeds e.g. in customary biogas plants. The exhaust air of such plants can advantageously be treated by the method according to the invention.

The method is also suitable for the treatment of exhaust gases of fuel cells or chemical synthesis plants which make use of a (partial) oxidation of organic substances.

The fluid streams of the origin a), b) or c) above can have, for example, either the pressure which roughly corresponds to the pressure of the ambient air, that is to say e.g. atmospheric pressure, or a pressure which deviates from atmospheric pressure by up to 1 bar.

The invention will be illustrated in more detail by the accompanying drawing and the examples hereinafter.

FIG. 1 shows an installation suitable for carrying out the method according to the invention.

According to FIG. 1, flue gas 1 is passed into the lower part of the absorption column 2 and brought into contact in countercurrent flow with an absorption liquid which is introduced via the line 16 into the upper region of the absorption column 2. The flue gas 3 depleted in carbon dioxide is cooled in the optional flue gas cooler 4, as a result of which some of the water and the stripping aid condenses out of the treated flue gas. The condensate is recycled as stream 35 to the absorption column 2; the stream 35 can also advantageously be applied at the bottom of the absorption column 2. In the scrubbing column 6, by means of a liquid aqueous phase which is introduced via the line 26, entrained stripping aid is eliminated from the treated flue gas; the flue gas is removed from the scrubbing column 6 via the line 7.

The absorption liquid which is loaded with carbon dioxide is taken up at the bottom of the absorption column 2 and conducted via the heat exchanger 9 and line 10 to the stripper 11. In the bottom part of the stripper 11 the loaded absorption liquid is heated via the evaporator 12 and partially evaporated. As a result of the temperature elevation, some of the absorbed carbon dioxide is converted back into the gas phase. The gas phase 29 is removed at the top of the stripper 11 and fed via the scrubbing section 30 to the condenser 32. Absorption liquid 34 which is condensed out is recycled at the top of the backwash section 30 or optionally fed to the regeneration column 21. In addition, additional scrubbing water 38 can be applied at the top of the backwash section 30. The stream 36 is applied as reflux to the regeneration column 21. The gaseous carbon dioxide is taken off as a stream 33. The regenerated absorption liquid 13 is recycled back to the absorption column 2 via the heat exchanger 9, line 14, the cooler 15 and line 16.

The loaded aqueous phase 27 is heated via the heat exchanger 19 and fed to the regeneration column 21. For the regeneration, the loaded aqueous phase is heated and partially evaporated at the bottom of the regeneration column 21 by the evaporator 22. The vaporous overhead product 28 of the regeneration column 21 is directly passed into the stripper 11. The regenerated aqueous phase is recycled to the scrubbing column 6 via line 23, heat exchanger 19, line 24, cooler 25 and line 26.

In order to be able to close the balance of the water and the absorbent, it is necessary, according to the selected operating conditions, to add some of the reflux 34 from the condenser 32 to the top of the regeneration column 21. For maintenance of the total water balance, a water-comprising stream 37 can, if necessary, be taken off at the bottom of the regeneration column 21. In order to be able to make up for the losses of stripping aid and amine, the corresponding amounts of stripping aid and amine (stream 39) are fed to the top of the absorber 2.

In the examples, the following abbreviations are used:
MEA=monoethanolamine
BisDMAPA=bis(3-dimethylaminopropyl)amine
PIP=piperazine
AMP=2-amino-2-methylpropanol
MAPA=3-methylaminopropylamine

EXAMPLE 1

Relative Cycle Capacity and Relative Required Amounts of Steam for Regeneration in the Case of Absorbents According to the Invention and not According to the Invention For determination of the carbon dioxide cycle capacity and the regeneration requirement, laboratory experiments were carried out using various absorbents loaded with carbon dioxide. Comparisons were made in this case between an aqueous 30% strength by weight solution of MEA with a mixture of 30% strength by weight MEA, 10 or 35% by weight of ethanol and 60 or 30% by weight of water.

For determination of the relative cycle capacity, the equilibrium loadings of carbon dioxide in the absorbent were determined as a function of carbon dioxide partial pressure at 40° C. (for absorber bottom) and 120° C. (for desorber bottom). For determination of the equilibrium loading a glass pressure vessel having a volume of approximately 100 cm$^3$ was used. In this, a defined amount of the absorbent was charged, the vessel was evacuated and at constant temperature carbon dioxide was metered in stepwise via a defined gas volume. The amount of carbon dioxide dissolved in the liquid phase was calculated taking into account the gas correction via the supernatant gas phase.

The following assumptions were made for estimations of the cycle capacity of the absorbent:
1. The absorber is charged at a total pressure of one bar with a carbon-dioxide-comprising flue gas having a carbon dioxide partial pressure of 130 hPa (equivalent to about 13% by volume of carbon dioxide in the flue gas at atmospheric pressure).
2. In the absorber bottom a temperature of 40° C. prevails.
3. During the regeneration in the desorber bottom a temperature of 120° C.
4. In the absorber bottom an equilibrium state is achieved. The carbon dioxide equilibrium partial pressure is therefore equal to the feed gas partial pressure of 130 hPa.
5. During the desorption a carbon dioxide partial pressure of 100 hPa prevails in the desorber bottom.
6. During the desorption an equilibrium state is achieved.

The capacity of the absorbent was determined from the loading (in m$^3$ at S.T.P. of carbon dioxide/t of absorbent) at the intersection of the 40° C. equilibrium curve with the line of constant feed gas carbon dioxide partial pressure of 13 kPa (loaded solution at the absorber bottom in the equilibrium) and from the loading at the intersection of the 120° C. equilibrium curve with the line of constant partial pressure of 100 hPa (regenerated solution at the desorber bottom in equilibrium). The difference between the two loadings is the cycle capacity of the respective solvent. A high capacity means that less solvent need be circulated and therefore the apparatuses such as, for example, pumps, heat exchangers and also pipes can be dimensioned to be smaller. In addition, the circulation rate also affects the energy required for the regeneration.

In Table 1 for absorbents according to the invention the values of the relative cycle capacity are shown (normalized to the aqueous 30% strength by weight MEA solution). Compared with the aqueous 30% strength by weight MEA solution, the relative cycle capacity is up to 42% higher when a solvent according to the invention is used.

EXAMPLE 2

Relative Absorption Rates for Absorbents According to the Invention and not According to the Invention For determination of the mass transport velocity of the carbon dioxide from the gas stream into the absorbent, measurements were carried out in a double stirred cell.

The mass transport velocity, for a reactive absorption, is composed not only of the physical mass transport but also of the reaction kinetics between the absorbent and the carbon dioxide. These two influencing parameters can be measured in the double stirred cell as a summary parameter. 30% by weight MEA in water served as a comparison base. The absorption liquids according to the invention comprised 10 to 35% by weight of ethanol.

In the double stirred cell a lower liquid phase of the absorbent to be tested is present which is in contact via a phase interface with the gas phase above. Liquid phase and gas phase can each be mixed by a stirrer. The double stirred cell is connected via a metering valve to a carbon dioxide store vessel. The pressure in the double stirred cell can be determined using a pressure meter. In the measurement the volumetric flow rate of carbon dioxide is indicated which is set in order to maintain a preset pressure in the double stirred cell.

The double stirred cell had an inner diameter of 85 mm and a volume of 509 ml. The cell was thermostatted during the experiment to 50° C. Before the start of the experiment the double stirred cell was evacuated. A defined volume of degassed absorbent was transported into the double stirred cell and thermostatted to 50° C. During heating of the unloaded absorbent, the stirrer was already switched on. The rotary speed of the stirrer was selected such that an even phase interface between the liquid phase and the gas phase was set. Wave formation at the phase interface must be avoided since as a result no defined phase interface would be present. After the desired experimental temperature was reached, carbon dioxide was introduced into the reactor via a control valve. The volumetric flow rate was controlled in such a manner that, in the double stirred cell, during the experiment a constant pressure of 50 hPa abs prevailed (corresponds to carbon dioxide partial pressure). With increasing experimental time, the volumetric flow rate of carbon dioxide decreased, since the absorbent with time became saturated and therefore the absorption rate decreased. The volumetric flow rate of carbon dioxide which flowed into the double stirred cell was recorded over the entire experimental period. The end of the experiment was reached as soon as carbon dioxide no longer flowed into the double stirred cell. The absorbent at the end of the experiment was virtually in the equilibrium state.

For assessment of the experiments, the absorption rate in mol of $CO_2/(m^3$ of absorbent·min) was determined as a function of the loading of the absorbent. The absorption rate was calculated from the recorded volumetric flow rate of carbon dioxide and the volume of absorbent charged. The loading was determined from the accumulated amount of carbon dioxide which was fed to the double stirred cell and the charged mass of absorbent.

In Table 2 the median relative absorption rates of various absorbents normalized to the median absorption rate of 30% strength by weight aqueous MEA are shown. The median absorption rate was determined as follows: starting from the maximum loading of the adsorbent (virtually equilibrium state at a $CO_2$ partial pressure of 50 hPa and a temperature of 50° C.), the absorption rates were determined at 75, 50 and 20% loading of the maximum loading and averaged. Absorption rates at less than 20% loading are not taken into account in the averaging, since the absorbent in the industrial process passes into the absorption apparatus with a residual loading of $CO_2$.

Compared with the absorption liquids which do not contain ethanol, the absorption rates of the absorbents according to the invention are significantly higher.

TABLE 1

Relative cycle capacity normalized to aqueous MEA.

| Composition in % by weight | Relative cycle capacity |
|---|---|
| 30% MEA | 100% |
| 30% MEA + 10% ethanol | 133% |
| 30% MEA + 35% ethanol | 142% |

TABLE 2

Relative median absorption rate of various absorbents normalized to aqueous MEA

| Composition in % by weight | Median relative absorption rate |
|---|---|
| 30% MEA | 100% |
| 30% MEA + 10% ethanol | 83% |
| 30% MEA + 35% ethanol | 191% |
| 30% BisDMAPA | 39% |
| 30% BisDMAPA + 35% ethanol | 19% |
| 30% BisDMAPA + 15% PIP | 81% |
| 30% BisDMAPA + 15% PIP + 35% ethanol | 242% |
| 26% AMP + 16% MAPA | 68% |
| 26% AMP + 16% MAPA + 25% ethanol | 204% |

The invention claimed is:

1. A process for removing acid gases from a fluid stream in which
   a) the fluid stream is treated with an absorption liquid which comprises at least one amine, a stripping aid, and water, wherein the stripping aid is at least one water-miscible liquid selected from the group consisting of alcohols, ethers, and ketones, the boiling temperature of which at atmospheric pressure is lower than that of water,
   b) the treated fluid stream is treated with a liquid aqueous phase in order to convert entrained stripping aid at least in part to the aqueous phase,
   c) the loaded aqueous phase is heated in order to expel the stripping aid at least in part and to regenerate the aqueous phase, and
   d) the regenerated aqueous phase is cooled and at least in part recycled to step b).

2. The process according to claim 1, wherein the treated fluid stream is intercooled before the treatment with the aqueous phase.

3. The process according to claim 1, wherein the loaded aqueous phase is preheated by indirect heat exchange with the regenerated aqueous phase.

4. The process according to claim 1, wherein the loaded absorption liquid is regenerated in a stripper by heating with partial evaporation of the absorption liquid, wherein the acid gases are liberated at least in part.

5. The process according to claim 4, wherein the loaded absorption liquid is preheated by indirect heat exchange with the regenerated absorption liquid.

6. The process according to claim 4, wherein the stripping aid which is expelled in step c) is passed into the stripper.

7. The process according to claim 4, wherein the liberated acid gases exiting from the stripper are cooled in order to condense at least in part the entrained amine, water and/or stripping aid to produce a liquid phase.

8. The process according to claim 7, wherein the liberated acid gases exiting from the stripper are scrubbed with a liquid phase.

9. The process according to claim 4, wherein the loaded absorption liquid is regenerated in the stripper and the liberation of the acid gases proceeds at a pressure of at least 3 bar (absolute).

10. The process according to claim 1, wherein the stripping aid is selected from alcohols.

11. The process according to claim 1, wherein the amine comprises at least one primary or secondary amine.

12. The process according to claim 1, wherein the absorption liquid comprises 10 to 50% by weight of stripping aid.

13. The process according to claim 1, wherein the absorption liquid comprises 10 to 60% by weight of amine.

14. The process according to claim 1, wherein the fluid stream originates a) from the oxidation of organic substances,
b) from the composting or storage of waste materials comprising organic substances, or
c) from the bacterial decomposition of organic substances.

15. The process according to claim 2, wherein the loaded aqueous phase is preheated by indirect heat exchange with the regenerated aqueous phase.

16. The process according to claim 2, wherein the loaded absorption liquid is regenerated in a stripper by heating with partial evaporation of the absorption liquid, wherein the acid gases are liberated at least in part.

17. The process according to claim 3, wherein the loaded absorption liquid is regenerated in a stripper by heating with partial evaporation of the absorption liquid, wherein the acid gases are liberated at least in part.

18. The process according to claim 5, wherein the stripping aid which is expelled in step c) is passed into the stripper.

19. The process according to claim 5, wherein the liberated acid gases exiting from the stripper are cooled in order to condense at least in part the entrained amine, water and/or stripping aid to produce a liquid phase.

20. The process according to claim 6, wherein the liberated acid gases exiting from the stripper are cooled in order to condense at least in part the entrained amine, water and/or stripping aid to produce a liquid phase.

* * * * *